(12) United States Patent
Shih

(10) Patent No.: US 7,368,895 B2
(45) Date of Patent: May 6, 2008

(54) APPARATUS FOR A POWER SUPPLY WITH BROWNOUT PROTECTION AND THE PROTECTING METHOD FOR THE SAME

(75) Inventor: Kuang-Chih Shih, Taipei (TW)

(73) Assignee: System General Corporation, Taipei Hsien (TW)

( * ) Notice: Subject to any disclaimer, the term of this patent is extended or adjusted under 35 U.S.C. 154(b) by 129 days.

(21) Appl. No.: 11/289,587

(22) Filed: Nov. 30, 2005

(65) Prior Publication Data

US 2007/0121357 A1 May 31, 2007

(51) Int. Cl.
*G05F 1/571* (2006.01)

(52) U.S. Cl. .................... 323/276; 323/237; 361/115
(58) Field of Classification Search ........ 323/282–288, 323/235, 239, 220, 223; 363/55, 48, 64, 363/59, 60, 63

See application file for complete search history.

(56) References Cited

U.S. PATENT DOCUMENTS 5,729,120 A * 3/1998 Stich et al. ................. 323/237

* cited by examiner

*Primary Examiner*—Rajnikant B. Patel
(74) *Attorney, Agent, or Firm*—Rosenberg, Klein & Lee

(57) ABSTRACT

An apparatus for a power supply with brownout protection and the method thereof are proposed. As a brownout condition occurs, the apparatus informs at least one microprocessor to process the shutdown process timely. The apparatus includes a power factor correction (PFC) circuit, and a bus capacitor generating a bus voltage by receiving an input voltage via the PFC circuit, and a PWM circuit generating multiple output voltages for the microprocessor, and a supervisor circuit generating a power-good signal in response to a proportional bus voltage, and a brownout circuit for disabling the boosting operation of the PFC circuit under a brownout condition. When the boosting operation is disabled, the bus voltage starts to fall. As the proportional bus voltage is lower than a threshold voltage, the supervisor circuit generates the power-good signal. Therefore, the microprocessor can process the shutdown procedure timely.

7 Claims, 7 Drawing Sheets

US 7,368,895 B2

APPARATUS FOR A POWER SUPPLY WITH BROWNOUT PROTECTION AND THE PROTECTING METHOD FOR THE SAME

BACKGROUND OF THE INVENTION

1. Field of the Invention

The present invention relates to a brownout protection used for a power supply having a PFC circuit, more particularly, an apparatus of the power supply is provided to inform a microprocessor to process a shutdown procedure when a brownout condition occurs.

2. Description of Related Art

Generally, the power supplies are applied to the power electronic devices. As an abnormal condition occurs on the power supply, the corresponding electronic device, such as the microprocessor on the motherboard, needs to spend a period of time to process the shutdown procedure. When an input voltage of the power supply is lower than a protection voltage, the conventional power supply will be turned off immediately for preventing damage. At present, if the microprocessor can't process the shutdown procedure, the data might be lost.

FIG. 1 shows a schematic circuit of a conventional power supply having a PFC circuit. Following description explains the protection operation of the power supply in case of a brownout condition occurs.

A brownout circuit 220 of a power supply 20 detects an input voltage $V_{IN}$, such as a rectified input voltage $V_{RECT}$, and produces a brownout signal $S_{BO}$ when the input voltage $V_{IN}$ is lower than a protection voltage (brownout condition occurs). As a standby circuit 230 receives the brownout signal $S_{BO}$, it will immediately disable a supply voltage $V_{CC}$ of a PFC circuit 240, a PWM circuit 250 and a supervisor circuit 260. Therefore, an output voltage $V_{OUT}$ of the power supply is cut-off. In the meanwhile, since the supervisor circuit 260 is not powered anymore, it cannot output a power-good signal $V_{PGO}$ to inform the microprocessor to process the shutdown procedure beforehand, such as the procedure of storing data in advance.

Referring to FIG. 2, which shows a timing diagram of the conventional power supply having the PFC circuit in case a brownout condition occurs. As the brownout circuit 220 produces a brownout signal $S_{BO}$ (High Level), the supply voltage $V_{CC}$ of the PWM circuit 250 will be turned off so as to disable a PWM signal $S_{PWM}$ (Low-level) and cut off the output voltage $V_{OUT}$ (Low-level) immediately. Meanwhile, the supervisor circuit 260 cannot output a power-good signal $V_{PGO}$ (Low-level) since its supply voltage is disabled. Therefore, the microprocessor 10 is unable to process the shutdown procedure.

A flowchart of brownout protection method for a conventional power supply having the PFC circuit is shown in FIG. 3. Firstly, the power supply 20 checks the input voltage $V_{IN}$ (P110). As the input voltage $V_{IN}$ is lower than the protection voltage, the brownout circuit 220 will generate the brownout signal $S_{BO}$ to the standby circuit 230 (P120). Finally, the standby circuit 230 will turn off the supply voltage $V_{CC}$ of the PFC circuit 240, the PWM circuit 250 and the supervisor circuit 260 (P130).

As described above, the power supply 20 having the PFC circuit are well known in the market. However, as the brownout condition occurs, the conventional art fails to provide a period of time for the microprocessor 10 to process the shutdown procedure before the microprocessor does not work.

SUMMARY OF THE DISCLOSURE

The present invention proposes an apparatus used for a power supply with brownout protection and the method thereof. The power supply provides a voltage for the microprocessor under a normal condition and controlling a power-good signal for the microprocessor under a brownout condition. Therefore, the microprocessor can process the shutdown procedure timely.

The power supply according to the present invention comprises a PFC circuit for correcting a power factor and boosting the input voltage; a bus capacitor coupled to the PFC circuit for forming a bus voltage across itself; a PWM circuit for transferring the bus voltage to an output voltage to power the microprocessor; a supervisor circuit for controlling a power-good signal to the microprocessor in response to a proportional bus voltage, so the microprocessor is able to process the shutdown procedure; and a brownout circuit for disabling the boosting operation of the PFC circuit in case of a brownout condition occurs.

A protecting method for the power supply with brownout protection described above comprises a step for judging if an input voltage is lower than a protection voltage; a step for disabling the boosting operation of the PFC circuit when the input voltage is lower than the protection voltage; a step for judging if a proportional bus voltage is lower than a threshold voltage; and a step for controlling a power-good signal to inform a microprocessor to process the shutdown procedure.

Reference will now be made in detail to the preferred embodiments of the present invention, examples of which are illustrated in the accompanying drawings.

BRIEF DESCRIPTION OF DRAWINGS

The present invention will be readily understood by the following detailed description in conjunction accompanying drawings, in which.

DETAILED DESCRIPTION OF THE PREFERRED EMBODIMENTS

For further understanding of the invention, please refer to the following detailed description illustrating the embodiments and examples of the invention. The description is only for illustrating the invention and is not intended to be considered limiting the scope of the claim.

Figure 1:
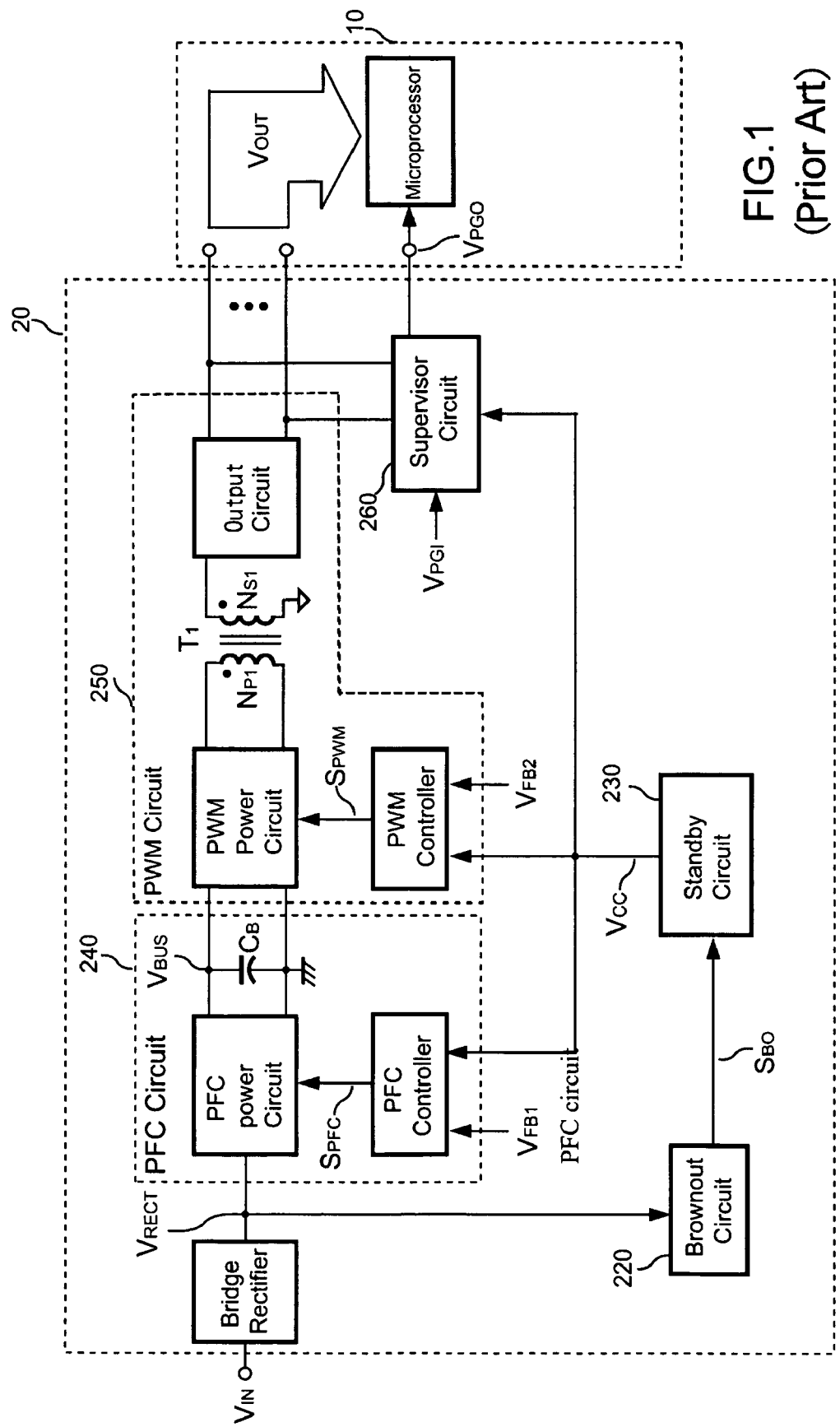
FIG. 1 shows a conventional power supply having a PFC circuit.
Figure 2:
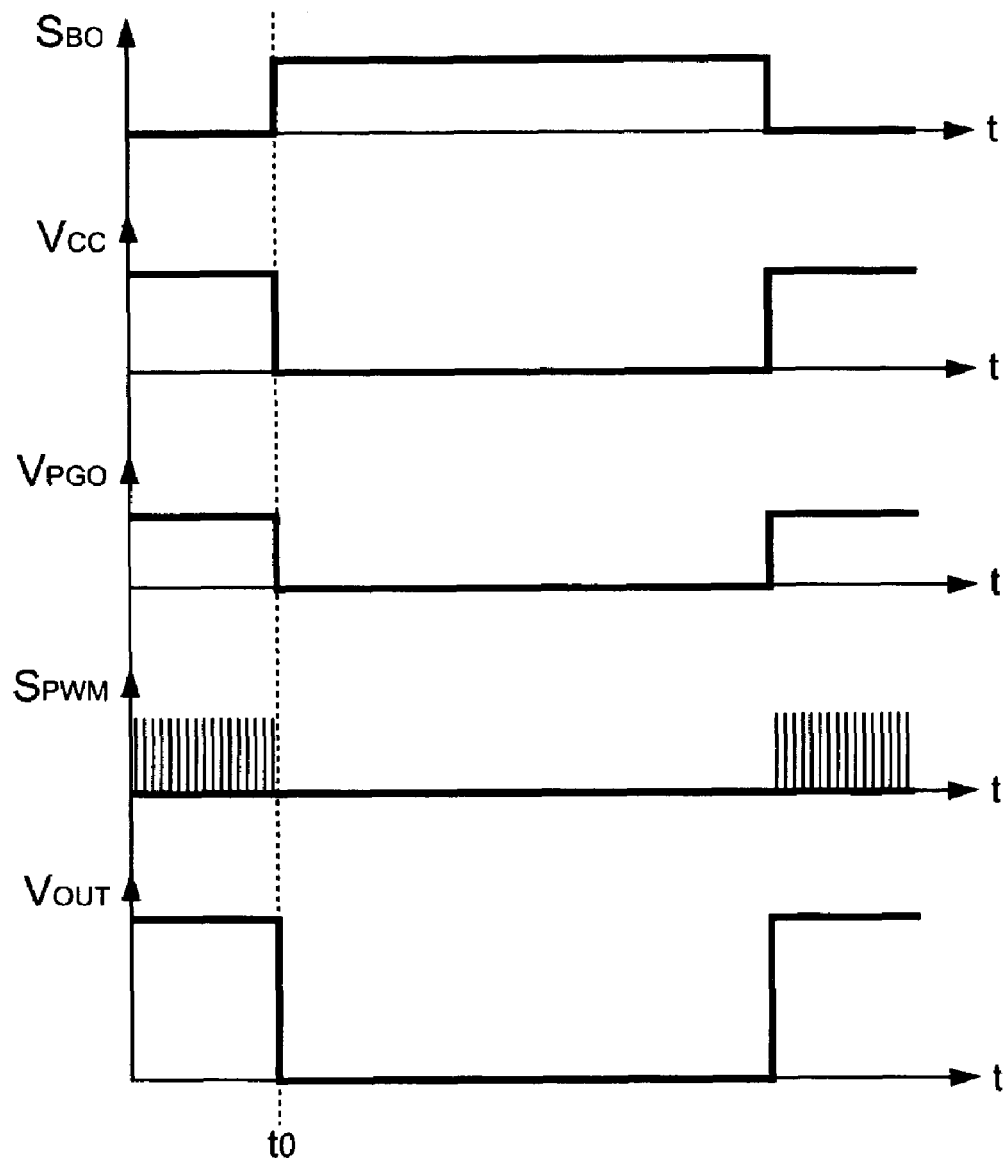
FIG. 2 shows a timing diagram of a brownout protection of conventional power supply having the PFC circuit.
Figure 3:
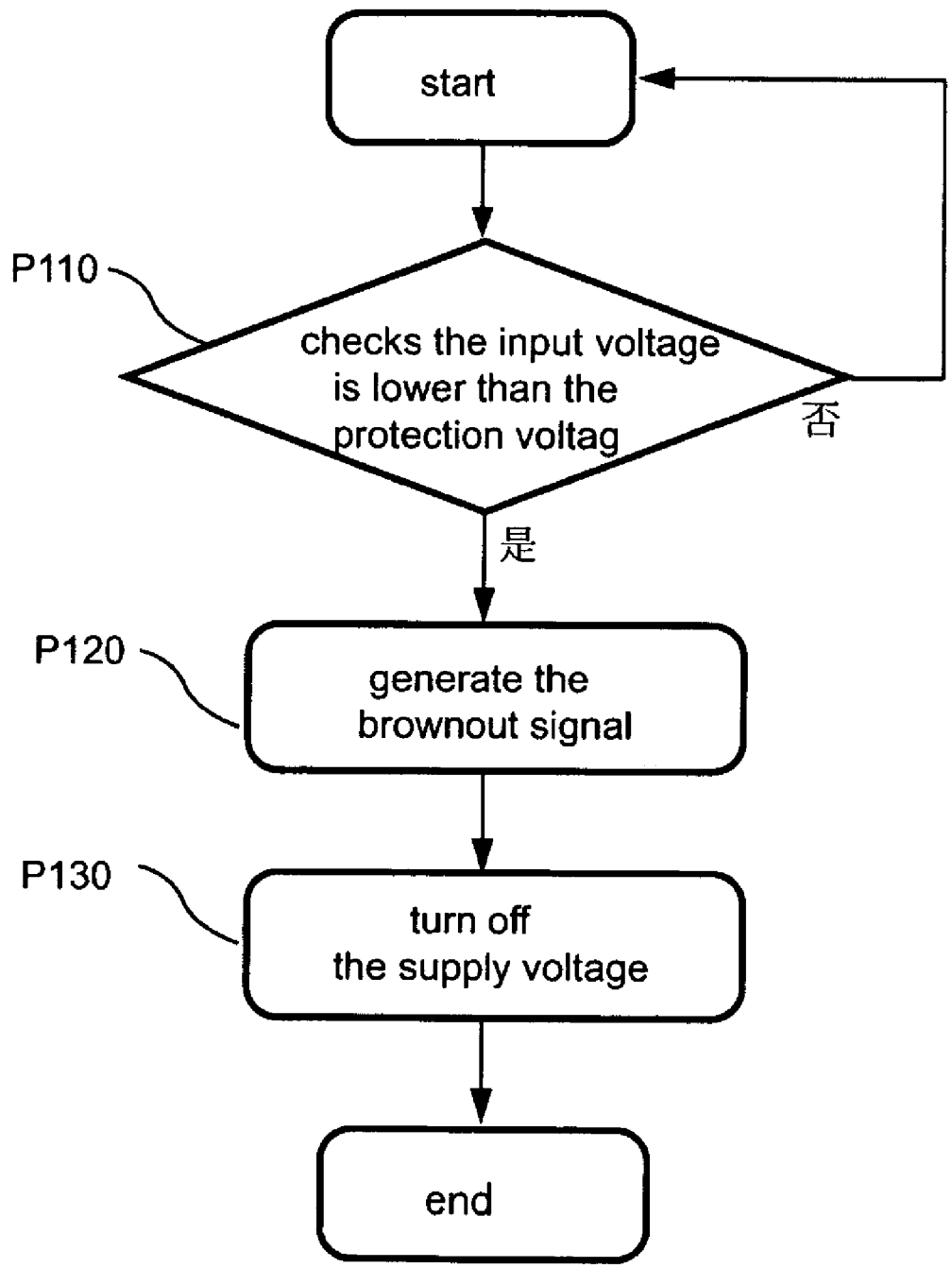
FIG. 3 shows a flowchart of the method for the conventional power supply having the PFC circuit with brownout protection.
Figure 4:
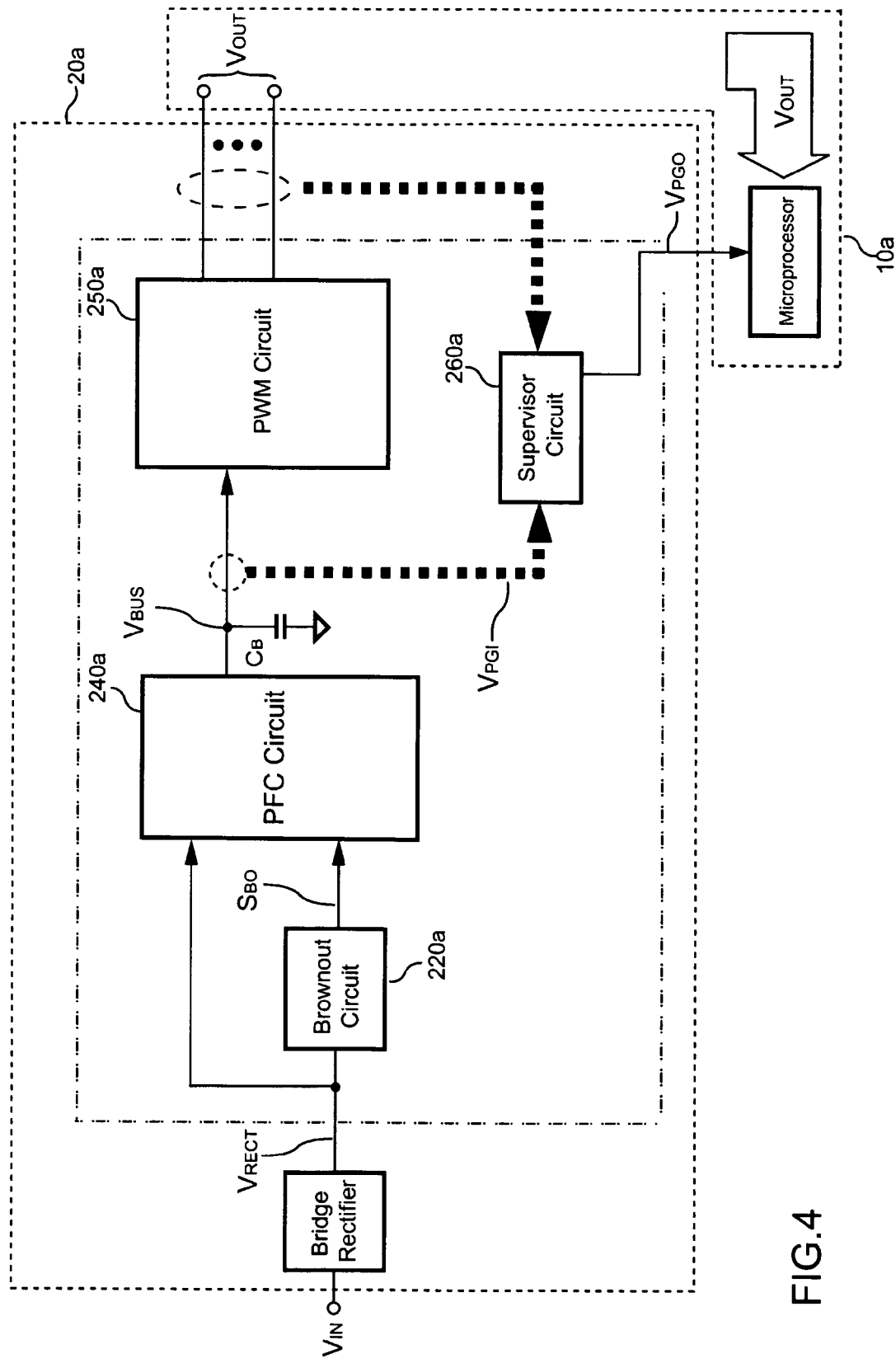
FIG. 4 shows a block diagram of a power supply with brownout protection according to the present invention.

FIG. 4 shows a block diagram of a power supply having a brownout protection apparatus. The power supply 20a powers a microprocessor 10a under normal condition and provides a period of time for the microprocessor 10a to process the shutdown procedure under brownout condition.

The power supply 20a comprises a PFC circuit 240a receiving a rectified input voltage $V_{RECT}$ (proportional to the input voltage $V_{IN}$) for correcting a power factor and boosting the input voltage $V_{IN}$(boosting operation). The PFC circuit 240a comprises a PFC controller (not shown) and a PFC power circuit (not shown).

The PFC power circuit performs a PFC function and boosts the input voltage $V_{IN}$. The PFC controller disables the boosting operation of PFC power circuit 240a in response to the brownout signal $S_{BO}$. A bus capacitor $C_B$ is coupled to the output terminal of the PFC circuit 240a for generating a bus voltage $V_{BUS}$.

A PWM circuit 250a is coupled to the bus capacitor $C_B$ for receiving the bus voltage $V_{BUS}$ so as to provide an output voltage $V_{OUT}$ for the microprocessor 10a.

A supervisor circuit 260a is coupled to the microprocessor 10a, which is used to detect a proportional bus voltage $V_{PGI}$ (as shown in FIG. 4) so as to control a power-good signal $V_{PGO}$. The power-good signal $V_{PGO}$ is used to inform the microprocessor 10a to process the shutdown procedure, such as the process for saving data instantly.

A brownout circuit 220a is coupled to the PFC circuit 240a. As the input voltage $V_{IN}$ is lower than a determined protection voltage (brownout condition occurs), the brownout circuit 220a will generate a brownout signal $S_{BO}$ after a period of time so as to disable the boosting operation of the PFC circuit 240a.

In the meantime, the bus voltage $V_{BUS}$ across the bus capacitor $C_B$ declines gradually in accordance with the capacitance of the bus capacitor $C_B$ until the bus voltage $V_{BUS}$ equals to the input voltage $V_{IN}$. Therefore, through the process for detecting the bus voltage $V_{BUS}$, the stability of the input voltage $V_{IN}$ can be determine When the proportional bus voltage $V_{PGI}$ is lower than a threshold voltage $V_{TH}$ of the supervisor circuit 260a, the supervisor circuit 260a will control a power-good signal $V_{PGO}$ (for example, the power-good signal $V_{PGO}$ will be pulled to low-level) to inform the microprocessor 10a to process the shutdown procedure. In addition, the output voltage $V_{OUT}$ will drop in response to the decline of the bus voltage $V_{BUS}$.

However, since the feedback circuit of the PWM circuit 250a will send back a feedback signal to the PWM controller, the PWM signal $S_{PWM}$ will be expanded to regulate the output voltage $V_{OUT}$ as a constant. The output voltage $V_{OUT}$ and the bus voltage $V_{BUS}$ can be expressed as:

$$V_{out} = \frac{V_{BUS}}{N} \times D.C. \quad (1)$$

Wherein, N is the turn ratio between the primary winding and the secondary winding of the transformer of the PWM circuit 250a; D.C. is the duty cycle of the PWM signal $S_{PWM}$.

As the bus voltage $V_{BUS}$ declines, the duty cycle of the PWM signal $S_{PWM}$ will reach a maximum value. As the bus voltage $V_{BUS}$ declines continuously, the output voltage $V_{out}$ will not be a constant anymore and will start to decline, as the point A shown in FIG. 6. The point A can be set by a low output voltage $V_{OFF}$ of the power supply.

Figure 5:
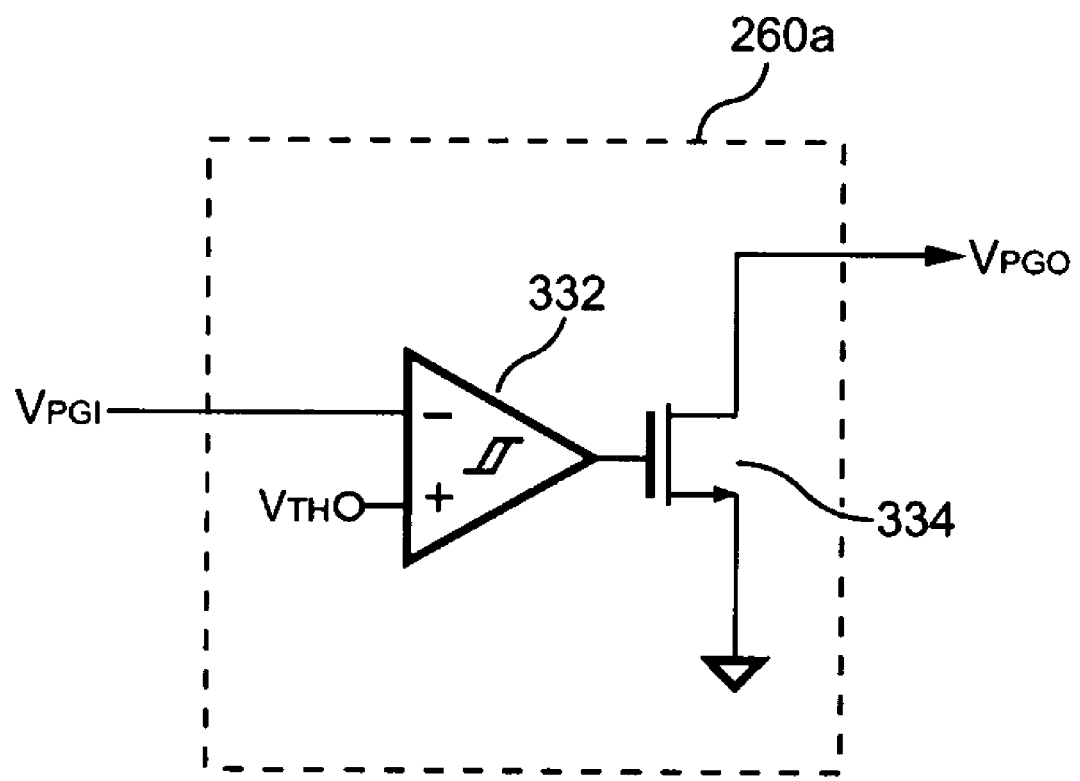
FIG. 5 shows a preferred embodiment of a supervisor circuit.

FIG. 5 shows a preferred embodiment of the supervisor circuit 260a. The supervisor circuit 260a can be implemented as a plurality of comparators and transistors, such as an exemplary embodiment having a hysteresis comparator 332 and a transistor 334. Wherein, a negative terminal of the hysteresis comparator 332 is supplied with the proportional bus voltage $V_{PGI}$, and a positive terminal of the hysteresis comparator 332 is supplied with the threshold voltage $V_{TH}$. As the proportional bus voltage $V_{PGI}$ is lower than the threshold voltage $V_{TH}$, the transistor 334 will be turned on and the power-good signal $V_{PGO}$ will be pulled to low-level.

Since the number of the microprocessor 10a coupled to the power supply 20a could be many, the clocking speed thereof varies. Furthermore, the clocking speed of the microprocessors relates to the delay time in the period of the shutdown procedure. In the embodiment, the supervisor circuit 260a can be implemented by the plurality of hysteresis comparators 332 and multiple transistors 334.

According to the present invention, the proportional bus voltage $V_{PGI}$ and the threshold voltage $V_{TH}$ can be adjusted properly so as to determine the delay time. Therefore, the power-good signal $V_{PGO}$ can be controlled by supervisor circuit 260a at different time for microprocessors processing the shutdown procedure timely. As mentioned above, the proportional bus voltage $V_{PGI}$ is implemented by attenuating the bus voltage $V_{BUS}$.

Figure 6:
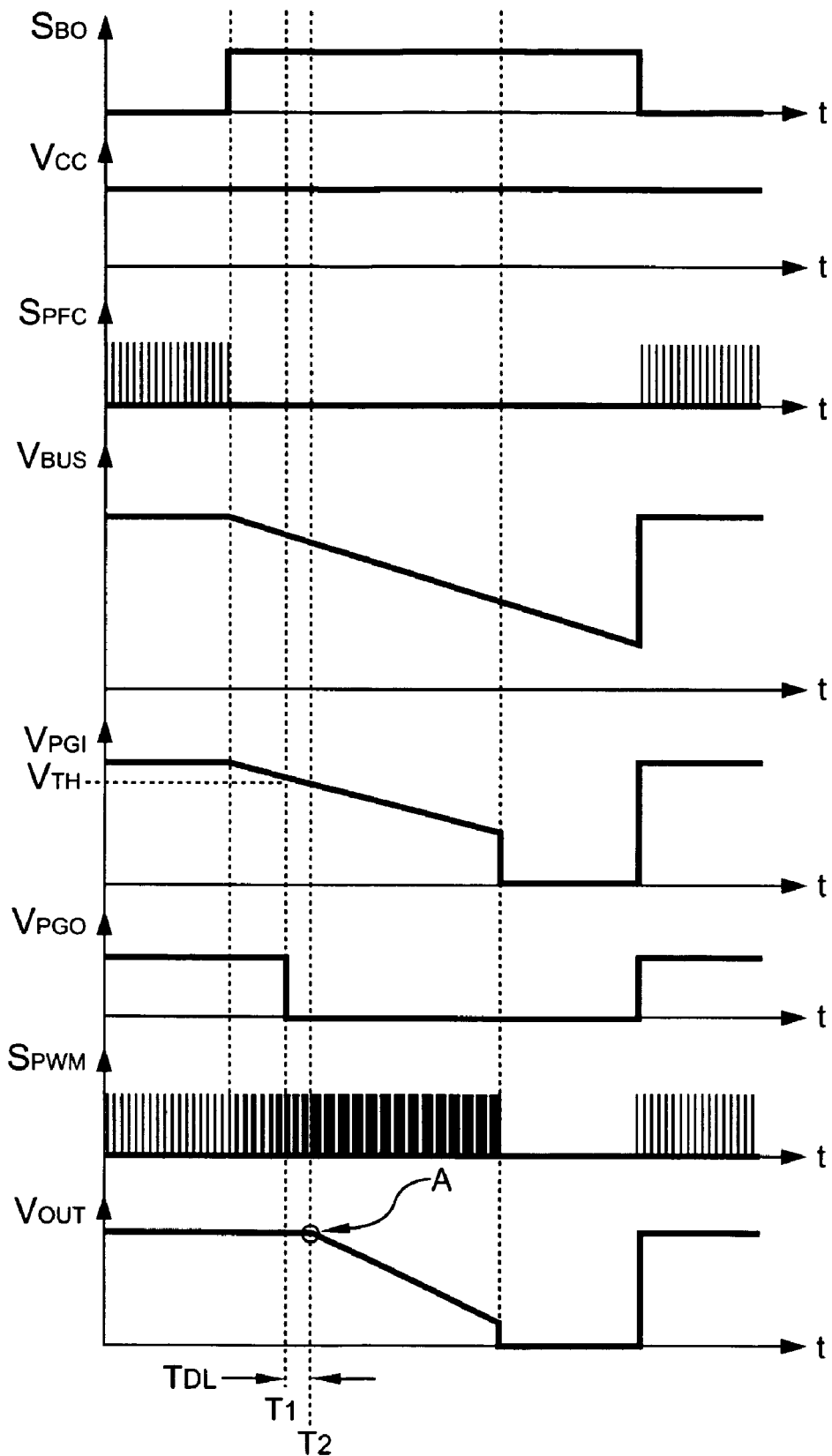
FIG. 6 shows a timing diagram of the power supply with brownout protection having the PFC circuit according to the present invention.

In view of FIG. 4, reference is made to FIG. 6 showing a timing diagram showing various waveforms of the present invention. The brownout circuit 220a generates the brownout signal $S_{BO}$ (High-level) to the PFC circuit 240a. At this moment, the supply voltage $V_{CC}$ of the PFC circuit 240a and the PWM circuit 250a are not disabled. However, the brownout signal $S_{BO}$ will turn off the control signal $S_{PFC}$ (disable boosting operation) of the PFC circuit 240a so as to decline the bus voltage $V_{BUS}$ across the bus capacitor $C_B$.

As the supervisor circuit 260a confirms that the proportional bus voltage $V_{PGI}$ is lower than the threshold voltage $V_{TH}$, the supervisor circuit 260a will control the power-good signal $V_{PGO}$ (Low-level), for microprocessor 10a processing the shutdown procedure. In addition, as the bus voltage $V_{BUS}$ falls, the on-time of a control signal $S_{PWM}$ of the PWM circuit 250a will begin to expand gradually for regulating the output voltage $V_{OUT}$ as a constant. Therefore, the on-time of the control signal $S_{PWM}$ will reach a maximum value at the time $T_2$. Since the input of the PWM circuit 250a declines, the output voltage $V_{OUT}$ Will start to fall.

Referring to FIG. 6, a time difference between the time $T_1$, (the power-good signal $V_{PGO}$ falls) and the time $T_2$ (the output voltage $V_{OUT}$ falls) can provide a delay time $T_{DL}$ for the microprocessor 10a to process the shutdown procedure.

Figure 7:
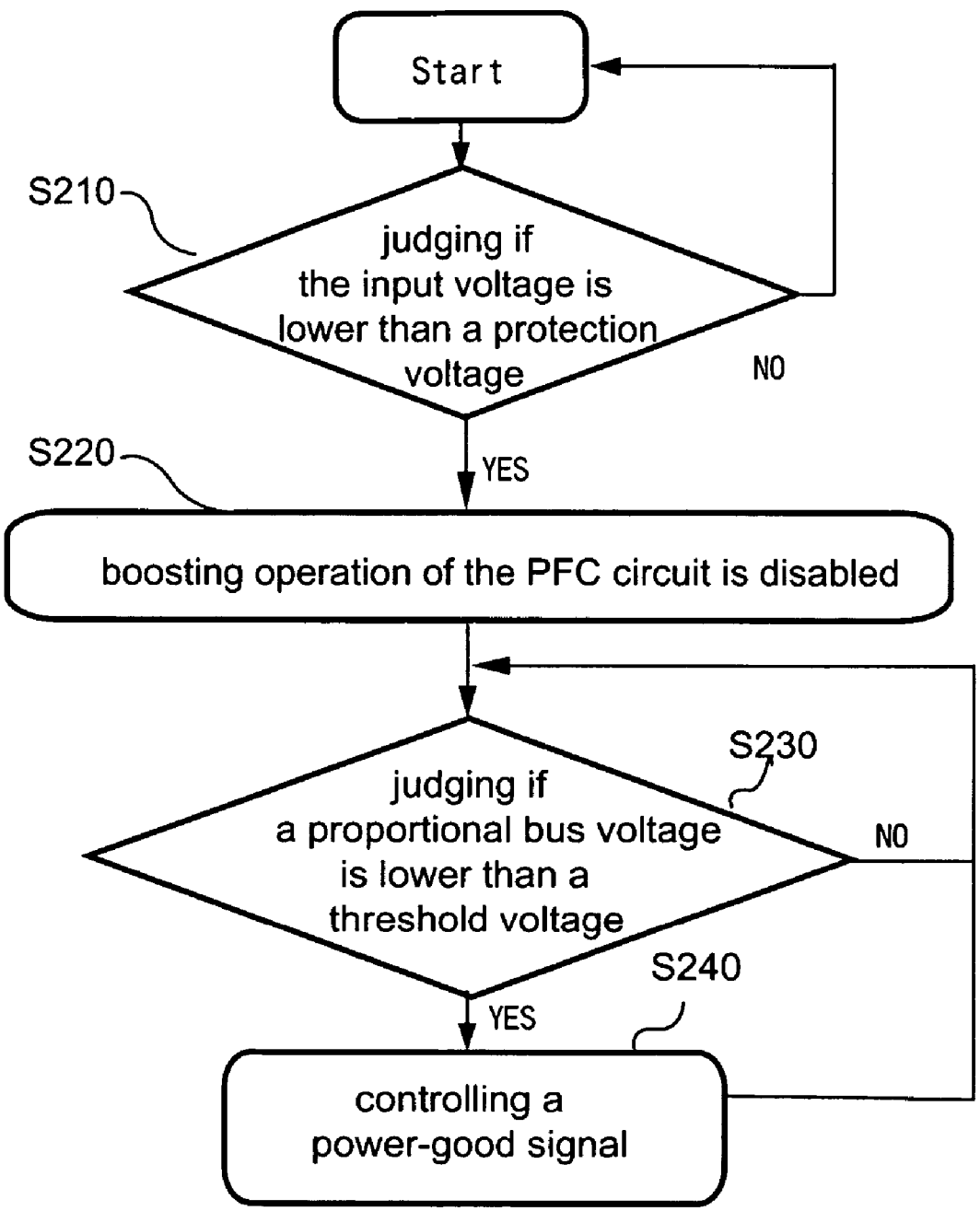
FIG. 7 shows a flowchart of the method for the power supply with brownout protection having the PFC circuit according to the present invention.

In view of FIG. 4, and reference is made to FIG. 7 showing a flowchart of the brownout protection. The protecting method for the power supply with brownout protection of the present invention is applied to the power supply having the PFC circuit to control at least one microprocessor processing the shutdown procedure as the brownout condition occurs.

The protecting method comprises the steps as follows.

Firstly, a step is provided for judging if the input voltage $V_{IN}$ is lower than a protection voltage so as to detect a brownout condition (S210) a brownout signal $S_{BO}$ is generated when the input voltage is lower than the protection voltage.

Next, a boosting operation of the PFC circuit is disabled so as to decline a bus voltage $V_{BUS}$ (S220).

Next, a step is provided for judging if a proportional bus voltage $V_{PGI}$ is lower than a threshold voltage $V_{TH}$ (S230).

Next, controlling a power-good signal $V_{PGO}$ supplied to the microprocessor when the proportional bus voltage $V_{PGI}$ is lower than the threshold voltage $V_{TH}$. (S240) Wherein, the threshold voltage $V_{TH}$ can be plural for respectively providing plural power-good signal $V_{PGO}$ for plural microprocessors.

As the steps mentioned above, in step 210, the step for confirming will be repeated continuously when the input voltage $V_{IN}$ is greater than the protection voltage. In step 230, the step for confirming will be repeated continuously when the proportional bus voltage $V_{PGI}$ is greater than the threshold voltage $V_{TH}$.

The present invention is applied in power supplies having the PFC circuit and is able to control the power-good signal to inform microprocessor to process the shutdown procedure before the microprocessor dose not work. Therefore, the data loss can be avoided under a brownout condition.

Although the invention has been described with reference to a particular embodiment thereof, it will be apparent to those skilled in the art that modifications to the described embodiment may be made without departing from the spirit of the invention. Accordingly, the scope of the invention will be defined by the attached claims and not by the above detailed description.

The many features and advantages of the present invention are apparent from the written description above and it is intended by the appended claims to cover all. Furthermore, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for a power supply with brownout protection, comprising:
   a PFC circuit, receiving an input voltage for performing a power factor correction and a voltage boosting operation to increase said input voltage to a bus voltage, wherein said bus voltage is greater than said input voltage;
   a bus capacitor, connected to an output terminal of said PFC circuit, wherein said bus capacitor is charged to a magnitude of said bus voltage;
   a PWM circuit having an input coupled to said bus capacitor and an output coupled to a microprocessor, said PWM circuit generating at least one output voltage at said output thereof in response to the bus voltage;
   a supervisor circuit having a first input coupled to said bus capacitor to detect a proportional bus voltage, a second input coupled to said output of said PWM circuit to monitor said at least one output voltage thereof, and an output connected to said microprocessor, said supervisor circuit outputting at least one power-good signal to said microprocessor said proportional bus voltage being less than a threshold voltage, said supervisor circuit outputting said at least one power-good signal preceding a reduction in said output voltage of said PWM circuit due to a reduction in said bus voltage during a brownout condition; and
   a brownout circuit, coupled between said input voltage and said PFC circuit, said brownout circuit disabling said voltage boosting operation of said PFC circuit responsive to detection of the brownout condition and thereby reduce said bus voltage, wherein once said at least one power-good signal is output to the microprocessor, the microprocessor process a shutdown procedure.

2. The apparatus of claim 1, wherein said supervisor circuit comprises a comparator having an output driving a transistor.

3. The apparatus of claim 2, wherein said comparator is a hysteresis comparator.

4. A protecting method for a power supply with brownout protection, wherein the power supply has a PFC circuit, as a brownout condition occurs, at least one microprocessor is controlled to process a shutdown procedure, said method comprising the steps of:
   judging if an input voltage is lower than a protection voltage;
   disabling a voltage boosting operation of the PFC circuit responsive to the input voltage being judged lower than the protection voltage to lower a bus voltage output from the PFC circuit;
   judging if a proportional bus voltage is lower than a threshold voltage; and
   controlling a power-good signal output to the microprocessor to initiate the shutdown procedure when the proportional bus voltage is lower than the threshold voltage and preceding a reduction in an output voltage supplied to the microprocessor.

5. The method of claim 4, wherein the step of judging if the proportional bus voltage is lower than a threshold voltage is processed via a supervisor circuit.

6. The method of claim 4, wherein the step of controlling a power-good signal output to the microprocessor to initiate the shutdown procedure is processed by a supervisor circuit.

7. The method of claim 4, wherein the step of judging if an input voltage is lower than a protection voltage and the step of disabling the boosting operation of the PFC circuit are processed by a brownout circuit.

\* \* \* \* \*